(12) United States Patent
Kishida et al.

(10) Patent No.: US 10,270,653 B2
(45) Date of Patent: Apr. 23, 2019

(54) NETWORK SECURITY DEVICE, NETWORK MANAGEMENT METHOD, AND NON-TRANSITORY COMPUTER-READABLE MEDIUM

(71) Applicant: PFU LIMITED, Ishikawa (JP)

(72) Inventors: Shinya Kishida, Kahoku (JP); Natsuki Kadoya, Kahoku (JP); Toru Nakazono, Kahoku (JP)

(73) Assignee: PFU LIMITED, Ishikawa (JP)

( * ) Notice: Subject to any disclaimer, the term of this patent is extended or adjusted under 35 U.S.C. 154(b) by 116 days.

(21) Appl. No.: 15/140,276

(22) Filed: Apr. 27, 2016

(65) Prior Publication Data

US 2017/0207965 A1 Jul. 20, 2017

(30) Foreign Application Priority Data

Jan. 14, 2016 (JP) .................................. 2016-005032

(51) Int. Cl.
*G06F 15/177* (2006.01)
*H04L 12/24* (2006.01)
*H04L 29/12* (2006.01)

(52) U.S. Cl.
CPC ........ *H04L 41/0816* (2013.01); *H04L 61/103* (2013.01); *H04L 61/2015* (2013.01); *H04L 61/2053* (2013.01); *H04L 61/6022* (2013.01); *H04L 61/6068* (2013.01)

(58) Field of Classification Search
CPC ............. H04L 61/2015; H04L 61/6022; H04L 61/103; H04L 61/1511; H04L 43/50; H04L 12/4641; H04L 45/74; H04L 61/609; H04L 41/12; H04L 61/2061; H04L 41/0806; G06F 2009/45595; G06F 9/45558; G06F 13/385; G06F 21/57
See application file for complete search history.

(56) References Cited

U.S. PATENT DOCUMENTS

| | | | |
|---|---|---|---|
| 6,473,411 B1 * | 10/2002 | Kumaki | H04L 29/06 370/331 |
| 2001/0005368 A1 * | 6/2001 | Rune | H04L 12/1854 370/390 |
| 2002/0062485 A1 | 5/2002 | Okano et al. | |
| 2007/0214270 A1 * | 9/2007 | Absillis | H04L 61/2015 709/227 |

(Continued)

FOREIGN PATENT DOCUMENTS

| | | |
|---|---|---|
| JP | 2002-158701 | 5/2002 |
| JP | 2004-104355 | 4/2004 |
| JP | 2005-260615 A | 9/2005 |

*Primary Examiner* — Michael A Keller
*Assistant Examiner* — Thao D Duong
(74) *Attorney, Agent, or Firm* — McDermott Will & Emery LLP

(57) ABSTRACT

There is provided a network security device comprising: a processor programmed to: identify a terminal for which communication is to be blocked; detect Dynamic Host Configuration Protocol (DHCP) request information which is requesting a DHCP server to allocate an IP address; send out a message meaning that the IP address requested by the DHCP request information is unusable; and transmit, if the detected DHCP request information is sent by the identified terminal, DHCP release information for releasing the IP address requested by this DHCP request information to the DHCP server.

4 Claims, 9 Drawing Sheets

(56) References Cited

U.S. PATENT DOCUMENTS

2009/0300176 A1* 12/2009 Shizuno ................. G06F 13/00
                                                                                     709/224
2013/0066951 A1* 3/2013 Agranat ............. H04J 14/0227
                                                                                     709/203

* cited by examiner

Information processing system 1

Security device 2

FIG. 4A

| Client terminal ID | MAC address | Communication rules |
|---|---|---|
| 0001 | ********** | Valid period : in 2017<br>Valid OS type : AA |
| 0001 | ********** | Communication disable |
| ... | ... | ... |

FIG. 4B

| DHCP request | DHCP ACK |
|---|---|
| Transaction ID :<br><br>MAC address of block-target :<br><br>Requested IP address :<br><br>IP address of DHCP server : | MAC address of DHCP server:<br><br>IP address of IP address : |

Communication blocking processing (S10)
(If DHCP ACK is detected)

DHCP request packet analysis operation (S30)

DHCP ACK packet analysis operation (S40)

IP address duplication messaging operation (S50)

US 10,270,653 B2

NETWORK SECURITY DEVICE, NETWORK MANAGEMENT METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2016-005032 filed Jan. 14, 2016.

BACKGROUND OF THE INVENTION

Field of the Invention

The present invention relates to a network security device and a network management method.

SUMMARY OF THE INVENTION

According to an aspect of the invention, there is provided a network security device comprising: a processor programmed to: identify a terminal for which communication is to be blocked; detect Dynamic Host Configuration Protocol (DHCP) request information which is requesting a DHCP server to allocate an IP address; send out a message meaning that the IP address requested by the DHCP request information is unusable; and transmit, if the detected DHCP request information is sent by the identified terminal, DHCP release information for releasing the IP address requested by this DHCP request information to the DHCP server.

According to another aspect of the invention, there is provided a network management method comprising: identifying a terminal for which communication is to be blocked; detecting DHCP request information which is requesting a DHCP server to allocate an IP address; sending out a message meaning that the IP address requested by the DHCP request information is unusable; and transmitting, if the detected DHCP request information is sent by the identified terminal, DHCP release information for releasing the IP address requested by this DHCP request information to the DHCP server.

According to another aspect of the invention, there is provided a non-transitory computer-readable medium storing thereon a computer program that causes a computer to perform a method comprising: identifying a terminal for which communication is to be blocked; detecting DHCP request information which is requesting a DHCP server to allocate an IP address; sending out a message meaning that the IP address requested by the DHCP request information is unusable; and transmitting, if the detected DHCP request information is sent by the identified terminal, DHCP release information for releasing the IP address requested by this DHCP request information to the DHCP server.

BRIEF DESCRIPTION OF THE DRAWINGS

Exemplary embodiments of the present invention will be described in detail based on the following figures, wherein:

FIG. 4A is a diagram illustrating information registered in a communication rules database;

FIG. 4B is a diagram illustrating information registered in an analysis results database;

DESCRIPTION OF EMBODIMENTS

An exemplary embodiment of the present invention will be described below with reference to drawings.

Figure 1:
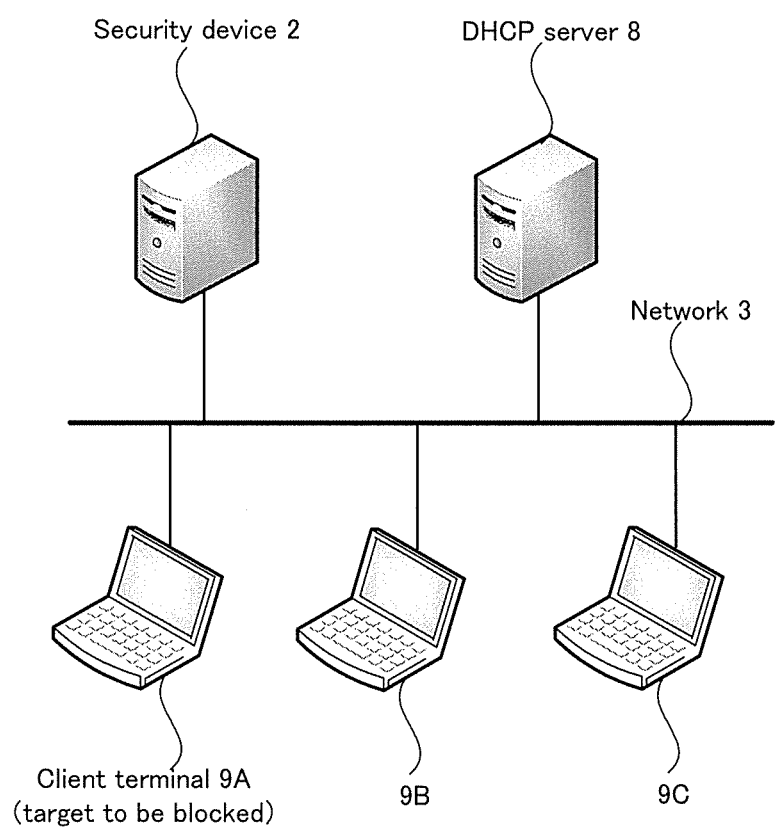
FIG. 1 is a diagram illustrating a hardware configuration of information processing system.

FIG. 1 is an explanatory diagram of a hardware configuration of an information processing system 1.

As shown in FIG. 1, the information processing system 1 includes a security device 2, a Dynamic Host Configuration Protocol (DHCP) server 8, and client terminals 9, which are interconnected via a network 3.

The security device 2 is a computer, which monitors data which is communicated on the network 3, and blocks some communication. The security device 2 is one example of a network security device according to the present invention.

In this exemplary embodiment, the network 3 is a Local Area Network (LAN) using IP addresses of Internet Protocol version 4 (IPv4), and the security device 2 monitors packets which are communicated on the LAN, and blocks the communication of the client terminal 9A to be blocked by IP address conflicts.

The DHCP server 8 is a server which assigns IP addresses to client terminals 9 dynamically. In this exemplary embodiment, the DHCP server 8 assigns IPv4 addresses to client terminals 9, corresponding to the request from these client terminals 9.

The client terminal 9 is a computer terminal which is connected to the network 3. The client terminal 9 is under monitoring of the security device 2. In this exemplary embodiment, the client terminal 9 communicates by using IPv4 address assigned by the DHCP server 8.

Now, a description will be given of a background that a communication block with IP address conflict is needed.

"Address Resolution Protocol (ARP) spoofing" is rewriting ARP tables to alter routing or block communication. The ARP spoofing is also used as a method for attacker's interception of communication. Therefore, recently some defense software against ARP spoofing have been emerging and been installed on some client terminals.

For example, one of such defense software prevents ARP table of client terminal from being rewritten by resending ARP request packets when detecting an ARP reply packets which try to rewrite the ARP table. The defense software also prevents ARP table of its communication partner from being rewritten in the same way. On the other hand, a security device of comparative example reroutes communications of a client terminal to the security device, and blocks these communications. Therefore when the defense software which prevents ARP table rewriting is installed on a client terminal, the security device of comparative example cannot reroute or block communications of such client terminal.

The security device 2 of this exemplary embodiment adopts obstruction of IP address assignment instead of rewriting ARP table as a means for blocking some communications. The security device 2 uses IP address conflict to obstruct IP address assignment.

Figure 2:
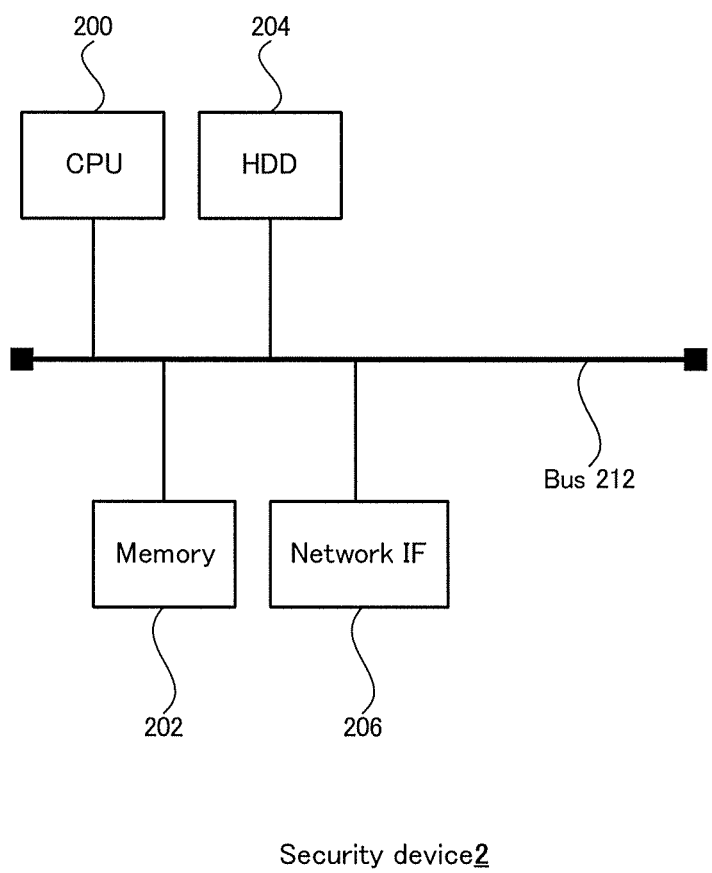
FIG. 2 is a diagram illustrating a hardware configuration of security device.

FIG. 2 is a diagram illustrating a hardware configuration of the security device 2.

As shown in FIG. 2, the security device 2 has a CPU 200, a memory 202, an HDD 204, and a network interface 206 (network IF 206), which are interconnected via a bus 212.

The CPU 200 is a central processing unit, for example.

The memory 202 is, for example, a volatile memory and functions as a main storage device.

The HDD 204 is, for example, a hard disk drive and functions as a nonvolatile storage device configured to store a computer program and other data files.

The network IF 206 is an interface for wired or wireless communication, which enables communication with the client terminal 9 via the network 3.

Figure 3:
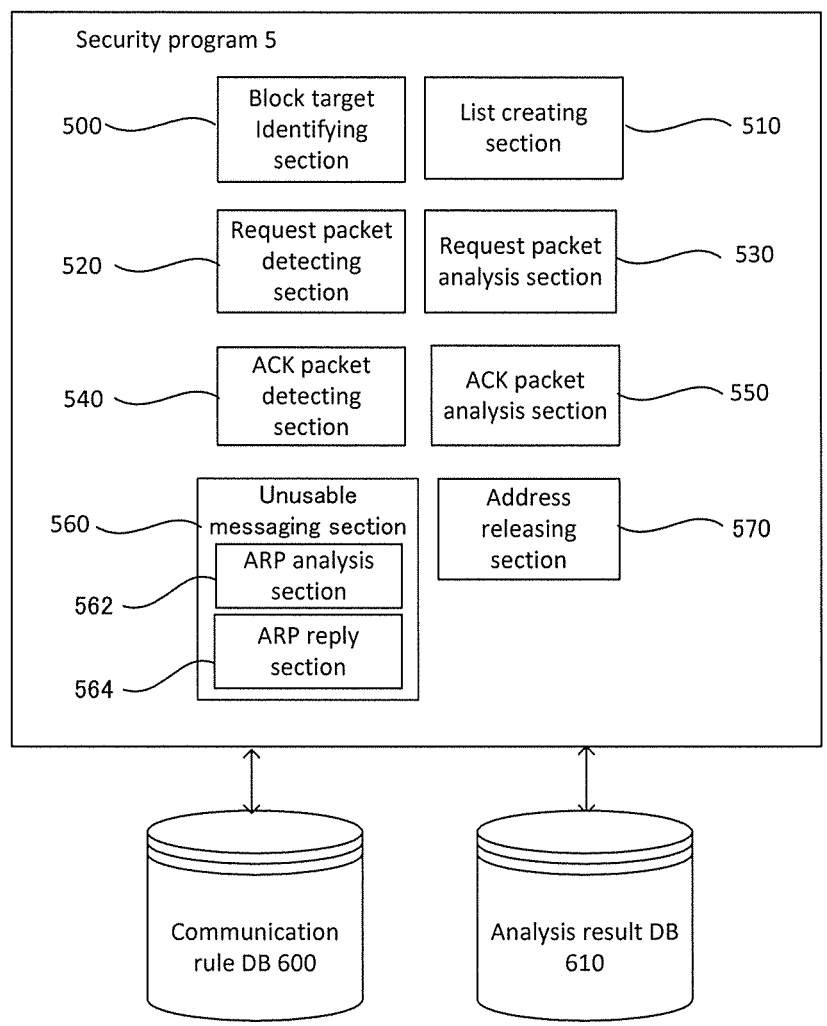
FIG. 3 is a block diagram illustrating a functional configuration of security device.

FIG. 3 is a block diagram illustrating a functional configuration of the security device 2.

As shown in FIG. 3, the security device 2 of the present example has a security program 5 installed in it and includes a communication rule database 600 (communication rule DB 600) and an analysis result database 610 (analysis result DB 610).

The security program 5 has a block target identifying section 500, a list creating section 510, a request packet detecting section 520, a request packet analysis section 530, an ACK packet detecting section 540, an ACK packet analysis section 550, an unusable messaging section 560, and an address releasing section 570.

The security program 5 maybe implemented partially or wholly by hardware such as an ASIC.

In the security program 5, the block target identifying section 500 identifies a computer terminal for which communication is to be blocked. For example, the block target identifying section 500 monitors communication on the network 3 and identifies a client terminal matched to given conditions as a terminal to be blocked. The block target identifying section 500 of the present example identifies a client terminal 9 to be blocked based on Media Access Control (MAC) address, valid period, and type of Operating System (OS) which are registered in the communication rule DB 600 by a network administrator.

The list creating section 510 gathers information concerning client terminals 9 on the network 3. The gathered information is used for realizing IP address conflicts or IP address releases. The list creating section 510 of the present example makes an ARP request to every client terminal 9 which is connected on the network 3, and gathers MAC addresses of client terminals 9.

The request packet detecting section 520 detects DHCP request information which is requesting a DHCP server to allocate an IP address. The request packet detecting section 520 of the present example monitors packets communicated on the network 3, and detects DHCP request packets.

The request packet analysis section 530 analyzes DHCP request information detected by the request packet detecting section 520, and registers the analysis results in the analysis result database 610. The request packet analysis section 530 analyzes DHCP request packets detected by the request packet detecting section 520, and registers, if the DHCP request packets are sent from the client terminal 9A to be blocked, a transaction ID, a MAC address of client terminal, an IP address requested by the client terminal, and an IP address of DHCP server which are included in the DHCP request packets into the analysis result database 610. The request packet analysis section 530 discards the detected DHCP request packets, if the DHCP request packets are not sent from the client terminal 9 to be blocked.

The ACK packet detecting section 540 detects DHCP acknowledgement information which is a reply to the DHCP request information. The ACK packet detecting section 540 of the present example detects DHCP ACK packets which are sent from the DHCP server 8 as a reply to DHCP request packets.

The ACK packet analysis section 550 analyzes DHCP acknowledgement information detected by the ACK packet detecting section 540, and registers the analysis results in the analysis result database 610. For example, the ACK packet analysis section 550 analyzes DHCP ACK packets detected by the ACK packet detecting section 540, and registers, if the detected DHCP ACK packets are sent to the client terminal 9A to be blocked, a MAC address of DHCP server and an IP address of DHCP server which are included in the DHCP ACK packets into the analysis result database 610. The ACK packet analysis section 550 discards the detected DHCP ACK packets, if the DHCP ACK packets are not ones which are sent to the client terminal 9 to be blocked. The ACK packet analysis section 550 of the present example identifies DHCP ACK packets which are replies to DHCP request packets sent by the client terminal 9A to be blocked, based on the transaction ID. The DHCP request packets of the client terminal 9A to be blocked are registered in the analysis result DB 610.

The unusable messaging section 560 sends out a message meaning that the IP address requested by the DHCP request information is unusable to the client terminal 9A which is identified as a client terminal to be blocked by the block target identifying section 500. For example, the unusable messaging section 560 sends the identified client terminal 9A a message that the IP address requested by the DHCP request information is in use. The message gets the identified client terminal 9A to recognize that the requested IP address is unusable.

The unusable messaging section 560 of the present example includes an ARP analysis section 562 and an ARP reply section 564.

The ARP analysis section 562 detects and analyzes an Address Resolution Protocol (ARP) request packet which is send out on the network 3, and instructs, if the ARP request packet is from a client terminal 9A to be blocked, the ARP reply section 564 to reply a message that IP address is in use. The ARP analysis section 562 discards the detected ARP request packet, if the ARP request packet is not from a client terminal 9A to be blocked.

The ARP reply section 564 sends out an ARP reply packet on the network 3 according to the analysis result of the ARP analysis section 562. The sent ARP reply packet is a reply to the ARP request packet, and has a message that the IP address is in use.

The address releasing section 570 transmits, if the detected DHCP request information is sent by the client terminal 9A (to be blocked) identified by the block target identifying section 500, DHCP release information for releasing the IP address requested by this DHCP request information to the DHCP server 8. For example, the address releasing section 570 transmits the DHCP release information to the DHCP server 8, before DHCP decline information is sent out by the client terminal 9A (to be blocked) which gets a message that the requesting IP address is in use from the unusable messaging section 560.

The DHCP release information is created with information registered in the analysis result database 610 by the address releasing section 570, and is an imitation of DHCP release information sent out by the client terminal 9A (to be blocked). Namely, the address releasing section 570 creates DHCP release packets with the same identifiers as the DHCP request packets detected by the request packet detecting section 520. The detected DHCP request packets is created by the client terminal 9A to be blocked, and the identifiers are a transaction ID, a MAC address of the client terminal 9A, an IP address requested by the client terminal 9A, and an IP address of DHCP server 8.

The address releasing section 570 uses the same identifiers (more specifically: MAC address of DHCP server) as the DHCP acknowledgement information detected by the ACK packet detecting section 540 to create DHCP release packets. However, if the DHCP acknowledgement information cannot be detected by the ACK packet detecting section 540, the address releasing section 570 alternatively uses the information gathered by the list creating section 510 to create the DHCP release packets and send out the created DHCP release packets before the DHCP decline information is sent out to the DHCP server 8.

FIG. 4A is a diagram illustrating information registered in the communication rule database 600. FIG. 4B is a diagram illustrating information registered in the analysis result database 610.

As shown in FIG. 4A as an example, the communication rule database 600 of the present example stores communication rules in relation to MAC address of client terminal. For example, the communication rule is a message that communication is enable/disable, or a condition such as communication permitted period or communication-permitted OS type.

As shown in FIG. 4B as an example, the analysis result database 610 of the present example stores transaction ID, MAC address of client terminal, requesting IP address, IP address of DHCP server, MAC address of DHCP server, and IP address of DHCP server in relation to the client terminal to be blocked. Among them, the transaction ID, MAC address of client terminal, requesting IP address, and IP address of DHCP server are extracted from the DHCP request packets, and the MAC address and IP address of DHCP server are extracted from the DHCP ACK packets.

Figure 5:
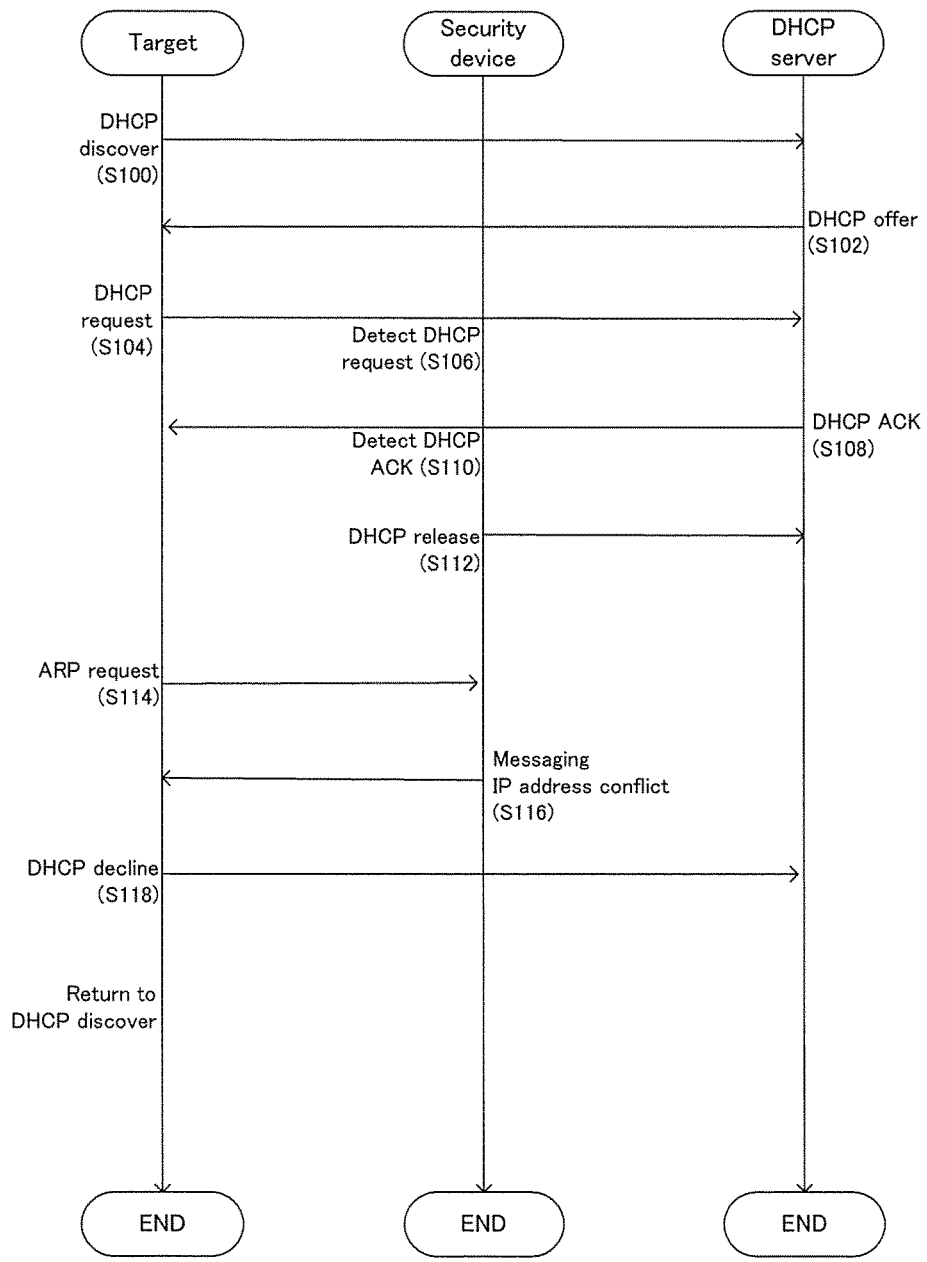
FIG. 5 is a sequence diagram illustrating a communication blocking processing.

FIG. 5 is a sequence diagram illustrating a communication blocking processing (S10) when DHCP acknowledgement information can be detected.

As shown in FIG. 5, in step 100 (S100), a client terminal 9A (to be blocked) sends a DHCP discover packet to a DHCP server 8 when requesting an assignment of an IP address by DHCP.

In step 102 (S102), the DHCP server 8 sends out a DHCP offer packet including some available IP addresses on the network 3 in reply to the DHCP discover packet.

In step 104 (S104), the client terminal 9A which received the DHCP offer packet sends a DHCP request packet to the DHCP server 8 to request usage of one of IP addresses included in the DHCP offer packet. These IP addresses are available on the network 3.

In step 106 (S106), the security device 2 monitors communications on the network 3, and detects the DHCP request packet which the client terminal 9A sends to the DHCP server 8.

In step 108 (S108), the DHCP server 8 which received the DHCP request packet sends a DHCP ACK packet to the client terminal 9A.

In step 110 (S110), the security device 2 detects the DHCP ACK packet which the DHCP server 8 sends to the client terminal 9A. The security device 2 analyzes the detected DHCP request packet and DHCP ACK packet to confirm that the IP address requested by the client terminal 9A is one assigned by the DHCP server 8.

In step 112 (S112), the security device 2 sends a DHCP release packet to the DHCP server 8 before the client terminal 9A sends out a DHCP decline packet. The sent DHCP release packet is created with information (such as IP address) included in the DHCP request packet and the DHCP ACK packet of the target (client terminal 9A) to be blocked, and is information requesting the DHCP server 8 to release the IP address which the DHCP server 8 assigned to the target to be blocked.

Accordingly, the exhaustion of IP address which can be assigned by the DHCP server 8 may be prevented in the present example.

In step 114 (S114), the client terminal 9A sends out an ARP request packet to confirm if the IP address requested by the DHCP request packet is in use on the network 3.

In step 116 (S116), the security device 2 detects the ARP request packet and sends out an ARP reply packet meaning that the IP address which the client terminal 9A to be blocked requested to use is already in use on the network 3 in reply to the ARP request packet. When receiving this ARP reply packet, the client terminal 9A recognizes that the IP address assigned by the DHCP server 8 is already in use on the network 8 and IP address conflict is occurring. As a result, communication of the client terminal 9A is blocked.

In step 118 (S118), after receiving the ARP reply packet meaning that the IP address is in use, the client terminal 9A sends a DHCP decline packet as for the assigned IP address to the DHCP server 8. After this, the target client terminal 9A returns to the DHCP discover step (S100), and repeats above steps (S100-S118).

By the way, the reason why the security device 2 sends a DHCP release packet before a DHCP decline packet be sent out is that some of DHCP servers keep identifying the assigned IP address as a disable address and do not assign the IP address to the other client terminal even after receiving a DHCP release packet, once they received the DHCP decline packet before the DHCP release packet.

Figure 6:
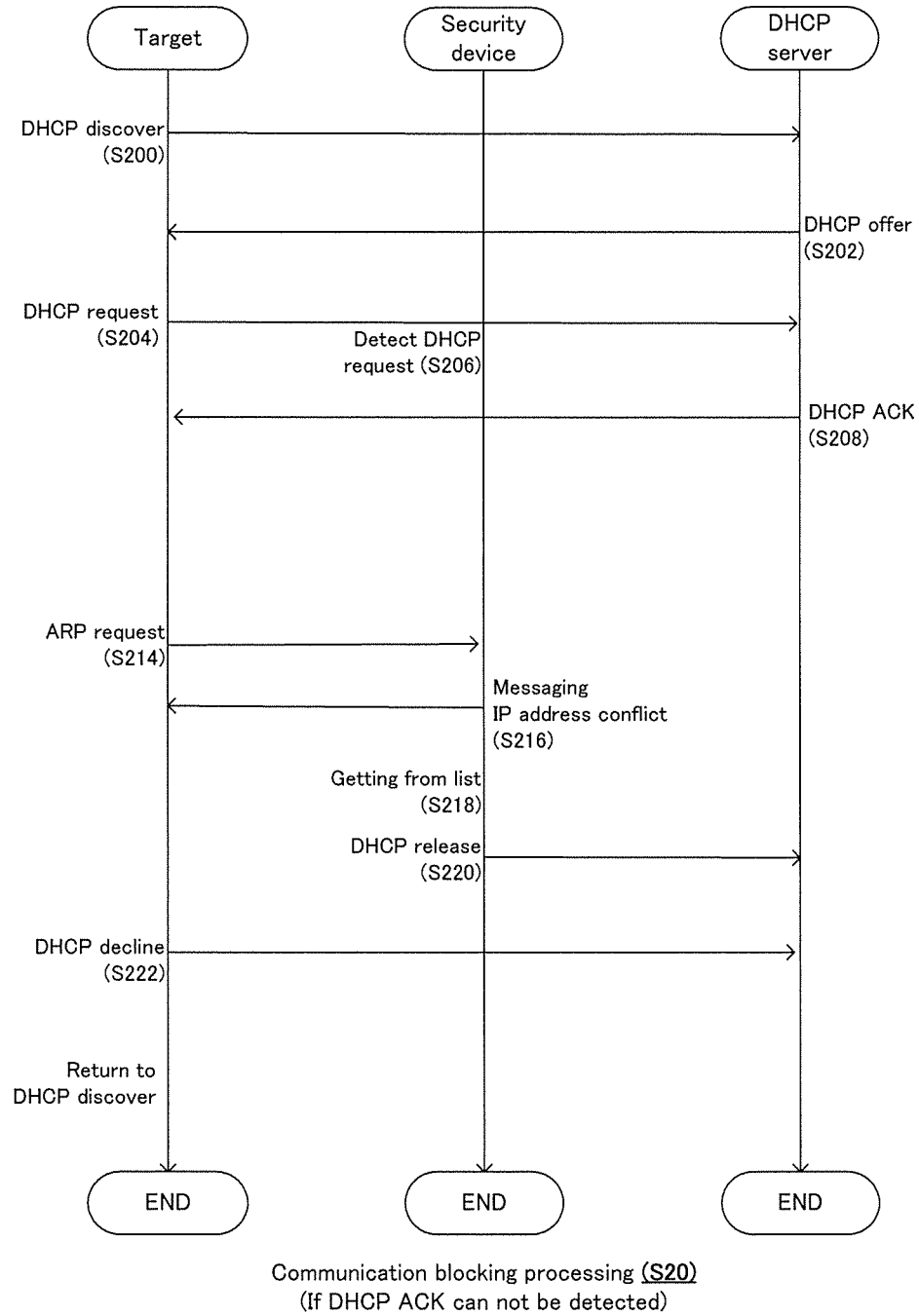
FIG. 6 is a sequence diagram illustrating a communication blocking processing when DHCP acknowledgement information is not detected.

FIG. 6 is a sequence diagram illustrating a communication blocking processing (S20) when DHCP acknowledgement information cannot be detected.

When the security device 2 cannot detect a DHCP ACK packet due to a high traffic volume on the network 3 or the like, as shown in FIG. 6, after the ARP reply packet sending processing (S216) it make up for insufficient information with the prepared information to create a DHCP release packet in step 218, and sends the created DHCP release packet to the DHCP server 8 in step S220. Thus, the assigning IP address is released.

The DHCP server 8 which received the DHCP release packet recognizes finishing the use of assigned IP address, and releases the IP address.

Figure 7:
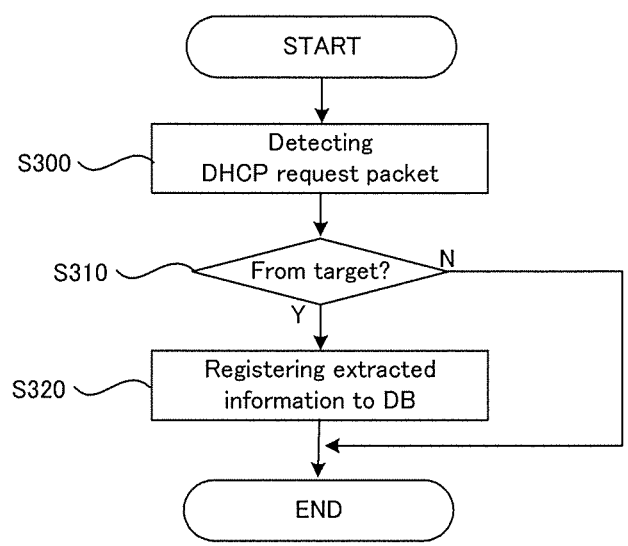
FIG. 7 is a flow chart illustrating an analysis operation of a DHCP request packet by a security device.

FIG. 7 is a flowchart illustrating an analysis operation (S30) of a DHCP request packet by the security device 2. When the client terminal 9 is connected to the network 3, it sends a DHCP request packet to all devices on the network 3 including DHCP server 8 and security device 2 to be assigned an IP address which is available on the network.

In step 300 (S300), the request packet detecting section 520 of the security device 2 detects a DHCP request packet sent by the client terminal 9, and transfers the detected DHCP request packet to the request packet analysis section 530.

The request packet analysis section 530 analyzes the DHCP request packet detected by the request packet detecting section 520.

In step 310 (S310), the block target identifying section 500 decides whether the detected DHCP packet is one sent by the client terminal 9 to be blocked based on the analysis result of the request packet analysis section 530 and the communication rules registered in the communication rule DB 600. For example, the communication rules are MAC addresses of client terminal to be blocked, or blocking conditions including MAC address, valid period, and valid type of OS.

The security device 2 proceeds to step 320 when the block target identifying section 500 decides that the detected DHCP packet is one sent by the client terminal 9 to be blocked. On the other hand, the security device 2 terminates the operation (S30) when the block target identifying section 500 decides that the detected DHCP packet is not one sent by the client terminal 9 to be blocked.

In step 320 (S320), the request packet analysis section 530 registers the analysis result of the DHCP request packet into the analysis result DB 610. That is, the request packet analysis section 530 registers only the analysis result regarding to the target to be blocked into the analysis result DB 610. More specifically, the request packet analysis section 530 registers, as analysis results, a transaction ID, a MAC address of the client terminal, an IP address requested by the client terminal, and an IP address of DHCP server into the analysis result DB 610.

Figure 8:
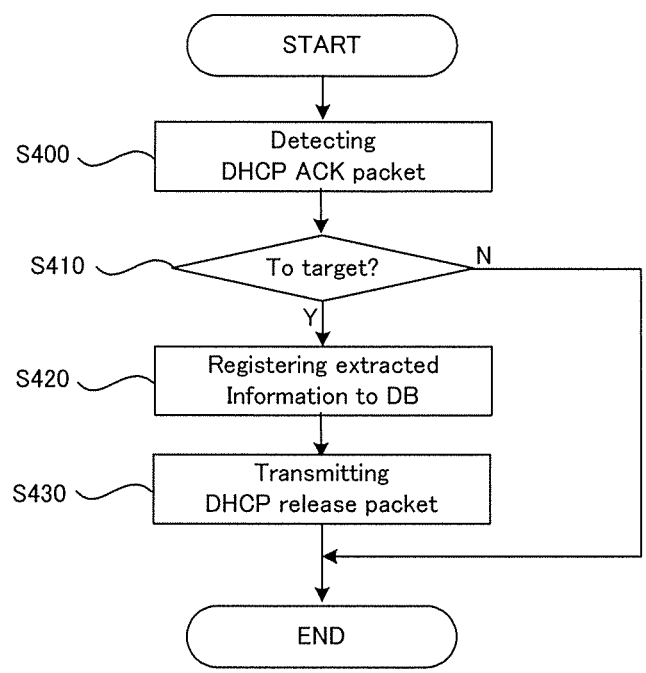
FIG. 8 is a flow chart illustrating an analysis operation of a DHCP ACK packet by a security device.

FIG. 8 is a flow chart illustrating an analysis operation (S40) of a DHCP ACK packet by a security device 2. The DHCP server 8 which received a DHCP request packet sends out a DHCP ACK packet to all devices on the network 3 including the client terminal 9 and the security device 2.

In step 400 (S400), the ACK packet detecting section 540 of the security device 2 detects the DHCP ACK packet sent by the DHCP server 8, and transfers the detected DHCP ACK packet to the ACK packet analysis section 550.

The ACK packet analysis section 550 analyzes the DHCP ACK packet detected by the ACK packet detecting section 540.

In step 410 (S410), the ACK packet analysis section 550 decides whether the detected DHCP ACK packet is corresponding to one of DHCP request packets registered in the analysis result DB 610, based on the analysis result of the DHCP ACK packet and the registered DHCP request packet. Specifically, the ACK packet analysis section 550 compares each transaction ID of DHCP request packets (that is, transaction ID registered in the analysis result DB 610) with a transaction ID included in the DHCP ACK packet, and decides whether the DHCP ACK packet is corresponding to the DHCP request packet. That is, the ACK packet analysis section 550 decides whether the detected DHCP ACK packet is to the client terminal to be blocked based on the comparison.

The security device 2 proceeds to step 420 when the ACK packet analysis section 550 decides that the detected DHCP ACK packet is corresponding to one of the registered DHCP request packets. On the other hand, the security device 2 terminates the operation (S40) when the ACK packet analysis section 550 decides that the detected DHCP ACK packet is not corresponding to any registered DHCP request packet (that is, the detected DHCP ACK packet is not to the target to be blocked).

In step 420 (S420), the ACK packet analysis section 550 registers the analysis result into the analysis result DB 610. More specifically, the ACK packet analysis section 550 registers a MAC address and an IP Address of DHCP server included in the DHCP ACK packet as analysis results into the analysis result DB 610.

In step 430 (S430), the address releasing section 570 creates a DHCP release packet based on the analysis results of the request packet analysis section 530 and ACK packet analysis section 550, and transmits the created DHCP release packet to the DHCP server 8. The DHCP release packet is information that releases an IP address assigned to the client terminal to be blocked, and includes a transaction ID, a MAC address of the client terminal (to be blocked), an IP address requested by the client terminal (to be blocked), an IP address of the DHCP server, and a MAC address of the DHCP server, which are extracted from the analysis results.

If a DHCP request packet and a DHCP ACK packet regarding to a client terminal to be blocked are detected and analyzed by the security device 2, the address releasing section 570 transmits the DHCP release packet to the DHCP server 8 independently from the timing of messaging by the unusable messaging section 560.

Figure 9:
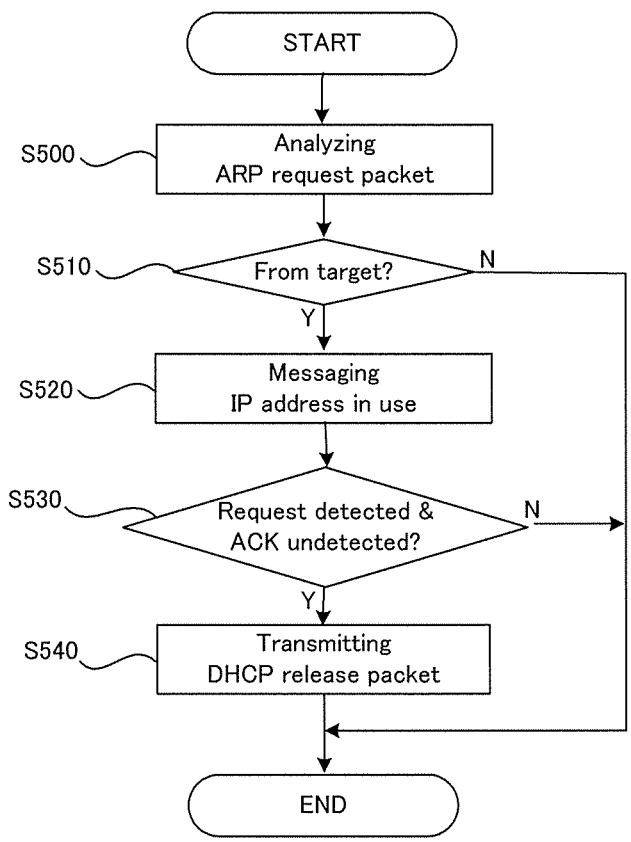
FIG. 9 is a flow chart illustrating a messaging operation of IP address duplication by a security device.

FIG. 9 is a flow chart illustrating a messaging operation (S50) of IP address duplication by a security device 2. The client terminal 9 which received a DHCP ACK packet sends out an ARP request packet to all devices on the network 3 including the security device 2 to confirm whether the IP address assigned by the DHCP server 8 is in use on the network 3.

In step 500 (S500), the ARP analysis section 562 of the security device 2 detects the ARP request packet from the client terminal 9, and analyzes the detected ARP request packet.

In step 510 (S510), the ARP analysis section 562 decides whether the detected ARP request packet is sent by the client terminal 9 to be blocked based on the analysis result of the ARP request packet and the communication rules registered in the communication rule DB 600.

The security device 2 proceeds to step 520 when the ARP analysis section 562 decides that the detected ARP request packet is one sent by the client terminal 9 to be blocked. On the other hand, the security device 2 terminates the operation (S50) when the ARP analysis section 562 decides that the detected ARP request packet is not from the client terminal 9 to be blocked.

In step 520 (S520), the ARP reply section 564 creates an ARP reply packet meaning that the IP address is in use based on the analysis result by the ARP analysis section 562, and sends out the created ARP reply packet on the network 3.

In step 530 (S530), the address releasing section 570 proceeds to step 540 when the DHCP request packet from the client terminal to be blocked has been detected by the security device 2 and the DHCP ACK packet corresponding to the DHCP request packet has not been detected. That is, when a DHCP ACK packet associated with the DHCP request packet by the transaction ID has not been detected, the address releasing section 570 proceeds to step 540. Otherwise, the address releasing section 570 terminates the messaging operation (S50).

In step 540 (S540), the address releasing section 570 creates a DHCP release packet and transmits the created DHCP release packet to the DHCP server 8. That is, when a DHCP request packet of the client terminal 9 to be blocked is detected and the corresponding DHCP ACK packet has not been detected for a given period of time after detecting the DHCP request packet by the security device 2, the address releasing section 570 creates a DHCP release packet based on information included in the DHCP request packet and the information gathered by the list creating section 510, and transmits the created DHCP release packets to the DHCP server 8.

As mentioned above, the security device 2 of the exemplary embodiment monitors packets on the network 3, and detects an ARP request packet requesting a use of an IP address from the client terminal 9 to be blocked. And the security device 2 analyzes the detected ARP request packet, and sends out an ARP reply packet meaning that the IP address is in use on the network 3. Accordingly, the IP address assigned to the client terminal to be blocked appears to be conflicted on the network, and the user of the client terminal may not notice that the client terminal is blocked by the security device 2.

In addition, the security device 2 may prevent an exhaustion of IP address which the DHCP server 8 assigns by creating and transmitting a DHCP release packet before a DHCP decline packet be sent out by the client terminal 9.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A network security device comprising:
   a memory; and
   a processor coupled to the memory and the processor configured to:
      identify a terminal for which communication is to be blocked;
      detect Dynamic Host Configuration Protocol (DHCP) request information which requests a DHCP server to allocate an IP address;
      send out a message meaning that the IP address requested by the DHCP request information is unusable;
      detect DHCP acknowledgement information which is a reply to the DHCP request information;
      create the DHCP release information, after pieces of the DHCP request information and the corresponding DHCP acknowledgement information are detected, based on the pieces of the DHCP request information; and
      transmit the created DHCP release information to the DHCP server, wherein
   the message is sent to the terminal and notifies that the IP address requested by the DHCP request information is in use,
   the DHCP release information is created, after the DHCP acknowledgement information is not detected within a given period of time after the corresponding DHCP request information is detected, based on the DHCP request information and prepared information, and
   the DHCP release information is transmitted before the terminal which is sent the message transmits DHCP decline information.

2. The network security device according to claim 1, wherein the transmitted DHCP release information includes the same identifier as the detected DHCP request information.

3. A network management method comprising:
   identifying a terminal for which communication is to be blocked;
   detecting DHCP request information which requests a DHCP server to allocate an IP address;
   sending out a message meaning that the IP address requested by the DHCP request information is unusable;
   detecting DHCP acknowledgement information which is a reply to the DHCP request information;
   creating the DHCP release information, after pieces of the DHCP request information and the corresponding DHCP acknowledgement information are detected, based on the pieces of the DHCP request information; and
   transmitting the created DHCP release information to the DHCP server, wherein
   the message is sent to the terminal and notifies that the IP address requested by the DHCP request information is in use,
   the DHCP release information is created, after the DHCP acknowledgement information is not detected within a given period of time after the corresponding DHCP request information is detected, based on the DHCP request information and prepared information, and
   the DHCP release information is transmitted before the terminal which is sent the message transmits DHCP decline information.

4. A non-transitory computer-readable medium storing thereon a computer program that causes a computer to perform a method comprising:
   identifying a terminal for which communication is to be blocked;
   detecting DHCP request information which requests a DHCP server to allocate an IP address;
   sending out a message meaning that the IP address requested by the DHCP request information is unusable;
   detecting DHCP acknowledgement information which is a reply to the DHCP request information;
   creating the DHCP release information, after pieces of the DHCP request information and the corresponding DHCP acknowledgement information are detected, based on the pieces of the DHCP request information; and
   transmitting the created DHCP release information to the DHCP server, wherein
   the message is sent to the terminal and notifies that the IP address requested by the DHCP request information is in use,
   the DHCP release information is created, after the DHCP acknowledgement information is not detected within a given period of time after the corresponding DHCP request information is detected, based on the DHCP request information and prepared information, and
   the DHCP release information is transmitted to the DHCP server before the terminal which is sent the message transmits DHCP decline information.

* * * * *